(12) United States Patent
Kruglick et al.

(10) Patent No.: US 9,096,783 B2
(45) Date of Patent: Aug. 4, 2015

(54) ACTIVATED PH CONTROL FOR PROTEIN GLUES

(75) Inventors: Ezekiel Kruglick, Poway, CA (US); Seth Miller, Englewood, CO (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 669 days.

(21) Appl. No.: 13/058,829

(22) PCT Filed: Sep. 14, 2010

(86) PCT No.: PCT/US2010/048796
§ 371 (c)(1),
(2), (4) Date: Feb. 25, 2011

(87) PCT Pub. No.: WO2012/036676
PCT Pub. Date: Mar. 22, 2012

(65) Prior Publication Data
US 2012/0064239 A1    Mar. 15, 2012

(51) Int. Cl.
*B05D 5/10* (2006.01)
*C09J 189/00* (2006.01)
*C09H 5/00* (2006.01)

(52) U.S. Cl.
CPC *C09J 189/00* (2013.01); *C09H 5/00* (2013.01)

(58) Field of Classification Search
CPC ................................ C09J 189/00; C09H 5/00
USPC .............. 427/207.1, 208, 208.2, 208.4, 208.6
See application file for complete search history.

(56) References Cited

U.S. PATENT DOCUMENTS

| 3,844,805 | A | 10/1974 | Long et al. | |
|---|---|---|---|---|
| 5,165,976 | A | 11/1992 | Newing et al. | |
| 5,766,331 | A * | 6/1998 | Krinski et al. | 106/157.2 |
| 5,994,073 | A * | 11/1999 | Bronstein et al. | 435/6.12 |
| 2002/0005251 | A1* | 1/2002 | Sun et al. | 156/330.9 |
| 2005/0113499 | A1* | 5/2005 | Tamcke et al. | 524/270 |
| 2006/0210618 | A1* | 9/2006 | Kubo et al. | 424/450 |

FOREIGN PATENT DOCUMENTS

| CN | 1042170 A | 5/1990 |
|---|---|---|
| WO | 00/08110 A1 | 2/2000 |
| WO | 03/051333 A1 | 6/2003 |

OTHER PUBLICATIONS

Fernandez, M.S. and Fromherz, P., "Lipoid pH Indicators as Probes of Electrical Potential and Polarity in Micelles," J. Phys. Chem., vol. 81, 1977, pp. 1755-1761.

Holmes-Farley, S.R., et al., "Acid-Base Behavior of Carboxylic Acid Groups Covalently Attached at the Surface of Polyethylene: The Usefulness of Contact Angle in Following the Ionization of Surface Functionality", Langmuir, 1985, 1, pp. 725-740.
Hettiarachchy, N. S., et al., "Alkali-Modified Soy Protein with Improved Adhesive and Hydrophobic Properties," Journal of the American Oil Chemists' Society, 1995, vol. 72, No. 12, pp. 1461-1464.
Zhong, Z., et al., "Adhesion Strength of Sodium Dodecyl Sulfate-modified Soy Protein to Fibreboard," Journal of Adhesion Science and Technology, 2001, vol. 15, No. 12, pp. 1417-1427.
Huang, W. et al., "Adhesive Properties of Soy Proteins Modified by Sodium Dodecyl Sulfate and Sodium Dodecylbenzene Sulfonate", Journal of the American Oil Chemists' Society. 2000. pp. 705-708, vol. 77, No. 7.
Kumar, R. et al., "Adhesives and plastics based on soy protein products," Industrial Crops & Products 16, No. 3 (2002): pp. 155-172.
Liu, Y. et al., "Chemical Modification of Soy Protein for Wood Adhesives," Macromolecular Rapid Communications, Sep. 2002, pp. 739-742, vol. 23, Issue 13.
Topallar, H. et al., "Mechanism of Micelle Formation in Sodium Dodecyl Sulfate and Cetyltrimethylammonium Bromide", Journal of Surfactants and Detergents 1998, pp. 49-51, vol. 1, No. 1.
Extended European Search Report dated Feb. 25, 2014 as received in Application No. 1085737.2.
Dominguez, A. et al., "Determination of Critical Micelle Concentration of Some Surfactants by Three Techniques," Journal of Chemical Education, vol. 74, No. 10, Oct. 1997, pp. 1227-1231.
Wang, A. et al., "Thermal Properties and Adhesiveness of Soy Protein Modified with Cationic Detergent," Journal of the American Oil Chemists' Society, vol. 82, No. 5, 2005, pp. 357-363.
Zhang Lu et al., "Effect of Sodium Bisulfite on Properties of Soybean Glycinin," Journal of Agricultural and Food Chemistry, vol. 56, No. 23, 2008, pp. 11192-11197.
Yildrim, M. et al., "Properties of Biopolymers from Cross-linking Whey Protein Isolate and Soybean 11S Globulin," Journal of Food Science, vol. 61, Issue 6, Nov. 1996, 1129-1132.
International Search Report and Written Opinion for International Patent Application No. PCT/US2010/048796 mailed Dec. 9, 2010.
"Lipoid pH Indicators as Probes of Electrical Potential and Polarity in Micelles," Fernandez, Marta S. and Fromherz, Peter. The Journal of Physical Chemistry, vol. 81. No. 18. 1977.
"Adhesive Properties of Soy Proteins Modified by Sodium Dodecyl Sulfate and Sodium Dodecylbenzene Sulfonate," Huang, Weining and Sun, Xiuzhi. JAOCS, vol. 77. No. 7. 2000.

* cited by examiner

*Primary Examiner* — Xiao Zhao
(74) *Attorney, Agent, or Firm* — Maschoff Brennan

(57) ABSTRACT

A glue composition can include: one or more glue proteins selected to undergo a conformational change responsive to a pH change; and one or more pH components selected to change the pH of the one or more glue proteins in response to a change in one or more conditions. The glue can be prepared by: providing one or more glue proteins selected to undergo a conformational change in response to a pH change; and combining the glue proteins with one or more pH components selected to change the pH of the one or more glue proteins in response to a change in one or more conditions.

25 Claims, No Drawings

ACTIVATED PH CONTROL FOR PROTEIN GLUES

CROSS-REFERENCE TO RELATED APPLICATIONS

The present application is a U.S national stage filing under 35 U.S.C. §371 of International Application No. PCT/US2010/048796, filed on Sep. 14, 2010.

BACKGROUND

In the glue arts, the viscosity of a glue can impact the effectiveness and adherence characteristics, whether a petroleum-based glue, polymer-based glue, or natural protein-based glue. The operating viscosity limits of some natural protein glues (e.g., soybean protein glues) are very large ranging from 500 to 75,000 cP depending upon the application and on the nature of the materials to be glued. A viscosity of 500-5000 cP can be useful for gluing materials which are highly absorbing, such as paper, soft board, and dried wood aggregates. A viscosity of 5000-25,000 cP can be useful for glue used in most wood laminating purposes (e.g., both cold and hot press). A viscosity over 50,000 cP can be useful for gluing mastic consistency wood and for laminating operations. A viscosity range of about 8000-20,000 cP has been specified for no clamp cold press techniques.

The high viscosity soybean protein glues result from increased intermolecular interactions due to unfolded protein molecules. The major forces that facilitate such interactions are electrostatic and covalent disulphide bonding between protein molecules. Ionic environments have been known to weaken the electrostatic interactions between protein molecules. Thus, the viscosity of protein glues can be varied by treating with salts or by using reducing agents without affecting the final adherence strength or water resistance. Enzymatic or alkaline hydrolysis also reduces the viscosity of protein glues. Also, a protein glue composition having a higher pH can have a higher rate of hydrolysis, better adherent strength, and improved water resistance. However, an unfortunate property of protein glues having high pH is a short storage life of less than about 48 hours, which is not sufficient for a commercial glue product.

Accordingly, natural protein glues that are prepared from natural proteins (e.g., not synthetic proteins) often have a high dependence on pH for effectiveness. Typical natural protein glues (such as soy protein glue) become competitive in strength of bond with petroleum glues around a working pH of 11. Unfortunately, when soy protein glues are prepared at a pH of 11, they become useless if not applied within 24-48 hours. As such, the storage time for strongly bonding protein glues is not compatible with the storage life needed for a commercial product. Synthetic proteins can be prepared for glue compositions; however, synthetic proteins often have properties similar to natural proteins. As a result, continued improvements in protein glues are needed.

SUMMARY

In one embodiment, a glue composition can include: one or more glue proteins selected to undergo a conformational change responsive to a pH change; and one or more pH components selected to change the pH of the one or more glue proteins in response to a change in one or more conditions.

In one embodiment, a method of preparing glue can include: providing one or more glue proteins selected to undergo a conformational change in response to a pH change; and combining the glue proteins with one or more pH components selected to change the pH of the one or more glue proteins in response to a change in one or more conditions.

In one embodiment, a method of gluing an article can include: providing a glue composition as described herein; and applying the composition to one or more articles to be glued such that the pH of the one or more glue proteins changes the conformation of the one or more glue proteins so that the one or more glue proteins adhere to the one or more articles.

The foregoing summary is illustrative only and is not intended to be in any way limiting. In addition to the illustrative aspects, embodiments, and features described above, further aspects, embodiments, and features will become apparent by reference to the following detailed description.

DETAILED DESCRIPTION

The illustrative embodiments described in the detailed description, and claims are not meant to be limiting. Other embodiments may be utilized, and other changes may be made, without departing from the spirit or scope of the subject matter presented herein. It will be readily understood that the aspects of the present disclosure, as generally described herein, can be arranged, substituted, combined, separated, and designed in a wide variety of different configurations, all of which are explicitly contemplated herein.

Described herein are improved natural protein glues having improved storage life. While the protein glues described herein are often natural protein glues prepared for natural proteins; the glues can also include synthetic proteins. For simplicity, the protein glues described herein can include natural and/or synthetic glue proteins. A "glue protein" is considered to be any protein that can participate in a gluing process. For example and without limitation a "glue protein" can be illustrated by soy proteins that are useful in glues. The protein glues can be prepared to have a long storage life and maintain increased adherence when used to glue an article. The protein glue can be prepared so that when there is a change in condition, such as being applied to an article, the protein glue will have improved adherence characteristics.

A glue protein usually can be characterized by having one or more of: 3,4-dihydroxyphenylalanine (DOPA), lysine, glycine, serine, or threonine. Historically, glue proteins have been proteins obtained from mussel proteins and soy proteins, but could be obtained from other sources. Synthetic glue proteins can include DOPA being conjugated to a protein. Also, the aforementioned amino acids can be coupled with a protein to form a glue protein. Additionally, sequences of the aforementioned amino acids and DOPA can be included in protein glues. A protein can also be characterized as a glue protein by measuring the amount of adherence associated with the protein, such as by adhering two objects together with the protein and measuring the amount of force required to pull the objects apart. Proteins that require more force to pull the objects apart would be considered to have higher adherence properties, and may be useful as glue proteins. Studies of this kind are well known. Additional information regarding glue proteins can be found in Kumar et al, especially at Table 1 (Rakesh Kumar et al.; Adhesives and plastics based on soy protein products; Industrial Crops and Products; 16 (2002) 155-172, which is incorporated herein by specific reference).

A protein glue can include one or more glue proteins selected to undergo a conformational change in response to a pH change, and one or more pH components selected to change the pH of the one or more glue proteins in response to a change in one or more conditions. Raising the pH changes the nature of the charges in the protein, and denatures the protein so that it unfolds and/or changes three dimensional conformation. For example, proteins rich in histidine will have the histidine deprotonated, which leads to loss of tertiary structure (i.e., three dimensional conformation). The proteins can be selected based on the pKa values and for denaturation at a select pH or pH range.

The protein glue can be configured to have a long storage life when not in use, but can then have an increased pH upon being applied to an article of manufacture. This combines two important properties of natural protein glues: long storage life for a commercial product at a lower or neutral pH; and increased adherence properties such as those obtained in high pH protein glues.

The improved protein glue can be obtained by configuring the composition to have a lower pH during storage and an increased pH upon application to an article to be glued. The change from a lower pH to a higher pH can result in the proteins changing from a substantially folded conformation (e.g., inhibited adherent conformation) to a substantially unfolded or less folded conformation (e.g., increased adherent conformation). The so-called folded protein conformation may also be considered a compact protein conformation while the so-called unfolded protein conformation may be considered an expanded protein conformation, where the compact conformation reduces amino acid interactions between proteins and the expanded protein conformation frees more amino acids to participate in protein-protein interactions. As such, the change of pH can open a protein three dimensional conformation so as to expose more amino acids for interacting with other amino acids of other proteins. The increased amino acid interactions between different proteins can facilitate increased adherence characteristics due to the interactions mimicking cross-linking in effect, especially upon the formation of disulfide bonds between different proteins. The formation of disulfide bonds can be enhanced as well by adding to the protein glue one or more of: carbon disulfide ($CS_2$), ethylene di- or tri-thiocarbonate, thiourea, or potassium xanthate.

It is known that proteins can change from a compact conformation to an expanded conformation by hydrolysis or by increasing the pH to about 11 or higher. Treatment with sodium hydroxide can unfold or expand the protein molecules and expose the polar and apolar amino acids, which in turn can increase the interaction between proteins. Also, the expanded proteins can have better interaction with wood, and thereby lead to an improvement in gluing wood articles. Additionally, increased interactions between glue proteins can improve the strength of bonding and adherence as well as improve water resistance.

The increased pH or basicity of the environment associated with a protein can be driven by the concentration of negative charges. For example, a more localized negative charge in an amino acid side group can lead to a propensity for having a proton as a counterion, which is reflected in an increase in pKa. When anionic amino acid side chains are brought together into a self-assembled monolayer or micelle, the charges are packed more closely together, which increases charge density (thereby increasing pKa). The effect of increased charge density and increased pKa has been seen in self-assembled monolayers on surfaces [S. R. Holmers-Farley, R. H. Reamey, T. J. McCarthy, J. Deutch, G. M. Whitesides, Langmuir 1985, 1, 725-740;] and micelles [M. S. Fernandez, P. Fromherz, J. Phys. Chem. 1977, 81, 1755-1761]. For example, the pH of an anionic indicator in an anionic micelle has been shown increase by up to 3 pKa units. The basicity of hydroxycoumarin increases three orders of magnitude when anionic micelles are present, as the increase in charge density increases basicity. The presence of cationic micelles has the opposite effect and decreases the basicity [M. S. Fernandez, P. Fromherz, J. Phys. Chem. 1977, 81, 1755-1761].

Accordingly, the improved protein glues that have a long storage life and enhanced bonding characteristics can be obtained by including one or more pH components that can increase pH upon exposure to a condition or stimulus. The pH components, which are described in more detail below, are considered to be substances that have a lower pH under one condition and then change pH upon exposure to a stimulus or a second condition so as to trigger a change in pH that allows the proteins in the glue to unfold or become more expanded. The triggered pH change of proteins in the glue composition can allow for triggered protein unfolding or expansion, which can result in higher viscosity and strength during use without the reduced storage life problems that arise from protein unfolding or expansion during manufacture.

In one example, the pH component can be a surfactant and the condition or stimulus that can provide the trigger can include evaporation of water from the protein glue composition. Some examples of surfactant include without limitation sodium or potassium salts of laurate, sulfate, oleate, stearate, palmitate, and the like, as well as other salts. Water evaporation can trigger the formation of surfactant micelles within the protein glue composition, and the micelles can cause a build-up of charge at the surfactant head groups, which in turn causes an increase in surfactant head group pKa and a concomitant increase in pH. Water evaporation can cause aggregation of surfactant molecules into a micelle, which can be driven by hydrophobic packing of the long surfactant hydrophobic chains, and can result in tight packing of charged surfactant head groups on the outside of the micelle. This tight packing of charges leads to a higher pKa than the molecules display below the critical micelle concentration (CMC). The result is a high strength and water resistant glue due to the high pH at bond time. An advantage is that the protein glue with the pH component has a lower or neutral pH during storage so that there is an increase in storage life, and the protein glue can be delivered as a single composition. Additionally, the change in condition is easily performed which is only evaporating water.

A protein glue can be prepared by dissolving a surfactant into an aqueous solution of protein (e.g., soy protein) having a lower or neutral pH, where the loading of surfactant is below the critical micelle concentration. For example, the final concentration of surfactant sodium laurate in the aqueous solution can be about 0.5% by weight, where the aqueous solution can include protein, surfactant, water, and optionally a low quantity of salt. The concentration of surfactant can depend on the amount of protein, but generally can range from about 0.1% to about 5%, from about 0.25% to about 2.5%, about 0.5% to about 1% or about 0.75%. The concentration of salt can range from about 0.001% to about 0.1%, from about 0.0025% to about 0.05%, about 0.005% to about 0.01%.

As water is evaporated from the glue past a particular level of water content, the surfactant aggregates into micelles by a hydrophobic effect, and the pH correspondingly increases to provide the benefits described herein. As the water evaporates by drying, where ambient drying is sufficient, but heating may be optional, the micelle forms, and the pH is affected. The particular level ranges for the desired end use, however, the particular level may be the critical micelle concentration (CMC). The compositions can be configured with an initial or storage pH of about 8 or less at which the soy proteins are stable for storage, and then increase pH upon exposure to a condition or stimulus to a pH from about 10 or higher, such as a pH of 11 or 12.

In one example, the aqueous solution can include soy proteins, which are mostly composed of globulins and are soluble in salt solutions, which typically would be an aqueous salt solution. In one instance, globulin heavy protein glues can be stored in an alkalai salt solution. The globulin heavy protein glue can then be exposed to the stimulus that increases the pH to make the protein glue basic and strongly adherent.

In one embodiment, a protein glue composition can include one or more glue proteins and one or more pH components. The glue proteins can be selected to undergo a conformational change responsive to a pH change. The glue proteins are selected to change conformation as the water evaporates. The pH components can be selected to change the pH of the glue proteins in response to a change in one or more conditions. The glue composition can be configured to have a lower or neutral pH during storage and then increase to a higher or basic pH upon exposure to a new condition or stimulus.

The one or more pH components can provide the glue proteins with about a neutral pH in a first condition, such as a manufacturing and/or storage condition. The pH components can provide the glue proteins with a higher pH or basic pH under a second condition, such as exposure to air or application to an article to be glued as well as exposure to vacuum. The neutral pH that can be configured during manufacture and for storage can be from about pH 6 to about pH 8, or about pH 6.5 to about pH 7.5, or around pH 7. The second condition or stimulus can increase the pH to a basic pH of 8 or higher, such as from about pH 8 to about pH 12, or about pH 9 to pH 11, or around pH 10.

The protein glue composition can be manufactured to have increased stability and storage life by preparing the glue composition to include one or more glue proteins that have a relatively folded, compact, or natural conformation, where such conformations can be considered to be less adherent conformations. These conformations can be natural for a protein at about a neutral pH compared to when at about a basic pH.

The proteins that are included in the glue composition can also have the ability or propensity to unfold, expand, or have a denatured conformation when the pH is increased to a basic pH. Such conformations of the proteins can be considered to be increased adherent conformations. These conformations can be un-natural or denatured at about a basic pH compared to when at a neutral pH.

The proteins can be selected based on the change in conformation in relation to pH. Such proteins can have different adherence and inter-protein interactions when at a higher pH compared to a lower pH. As such, the proteins can be selected based on their conformation changes upon changes in pH. The amino acid types and arrangement (e.g., sequence) can be selected for the desired change in conformations described herein. In one option the proteins can be natural proteins; however, natural proteins can be mutated by amino acid substitutions, deletions, or insertions within the amino acid sequence. Such mutant proteins can be modified selectively to provide desired conformation properties that response to changes in pH, as described above. In addition to mutant proteins, partially or completely synthetic proteins can be used in the glue compositions. A partially synthetic protein can refer to a protein that has a portion that is a natural protein or portion of a natural protein, and such natural protein is used in a synthetic scheme to add additional amino acids or amino acid sequences as well as chemically modify the amino acid side groups. A synthetic protein can be a product of completely synthetic processes.

The natural proteins can be from any of the six kingdoms of animalia, plantae, fungi, protista, archaea, and bacteria, and any of the phyla or taxonomic characterizations thereunder. Some examples of sources of natural proteins can be from plants, animals, insects, spiders, crabs, worms, nematodes, mollusks, snails, and other related sources. Specific examples of protein sources can include soy proteins, molluscan proteins, mussel proteins, drosophila proteins, as well as others. It is known that some proteins are more adherent than others, and such proteins can be favorable in some instances. In other instances the proteins can be less adherent at lower or neutral pH, but become more adherent at higher or basic pH.

The glue proteins can include substantially all of the proteins from these sources. The proteins can be purified, synthesized, or purchased. In one example, waste flour and/or general soy proteins can be processed through a chemical isolation path to result in a suitable protein glue, which protein glue can be characterized by the overall average amino acid mix to include the aforementioned amino acids that are typically present in glue proteins. Additional information on processing can be found in Liu et al. (Yuan Liu et al.; Chemical Modifications of Soy Protein for Wood Adhesives; Macromol. Rapid Commun.; (2002) 23: 739-742, which is incorporated herein by specific reference).

In one embodiment, a pH component can be a substance that is both anionic and hydrophobic. For example, the anionic, hydrophobic substance can be a hydroxycoumarin or derivative thereof, such as but not limited to 4-hydroxycoumarin, acenocoumarol, dicumarol, ethyl biscoumacetate, phenprocoumon, warfarin, 7-hydroxycoumarin, umbelliferone, dihydroxyanthraquinone, laurate salts, oleate salts, stearate salts, other hydrophobic salts, acids thereof, or others.

In one embodiment, the pH component can have an anionic region and a hydrophobic region. A large class of such pH components includes anionic surfactants. Anionic surfactants can include one or more anionic charged head groups and one or more hydrophobic tails. The anionic surfactants can include but are not limited to surfactants having carboxylate anionic head groups, such as laurate, oleate, stearate, etc.; various electron withdrawn or conjugated alcohols such as phenolates, naphtholates, deprotonated coumarin derivatives, etc.; various phosphates or phosphonates.

In one embodiment, the pH component can include a surfactant. The glue composition can be manufactured with the surfactant present at a concentration that is less than a critical micelle concentration (CMC) so that during storage the composition remains with the surfactant at less than the CMC. Accordingly, manufacturing or storage, such as air-tight storage or storage under an inert gas, can be considered to be the first condition where the pH is lower or neutral. The surfactant can then form a micelle at the CMC upon exposure to the second condition which accumulates charge and increases the pH.

In one embodiment, the pH component can be a combination of surfactant and anionic base. The surfactant can be an anionic surfactant such as but not limited to those described above, zwitterionic surfactant such as but not limited to sulfonates, sultaines, carboxylates, and phosphates, and/or nonionic surfactant such as but not limited to fatty alcohols, polyethylene glycols, polyoxypropylene glycols alkyl ethers and sorbitan alkyl esters. The anionic base can also associate within a micelle formed from the surfactant upon reaching the second condition. Such association is via charge-charge interaction, van der waals, or other forces. Non-limiting examples of anionic bases include Brønsted-Lowry anionic bases and Lewis anionic bases, which can include but are not limited to one or more of oxy-anions, $H_2PO_4^{-1}$, $HPO_4^{-2}$, $PO_4^{-3}$, $HSO_3^-$, $SO_3^{-2}$, $HCO_3^-$, $CO_3^-$, $COO^-$ and/or $O^-$, as well as molecules having the anionic base as a substituent. The anionic base can increase pKa at the second condition compared to the first condition as described or when exposed to a stimulus. As such, the anionic base can contribute to the increase of pH upon exposure to the second condition or stimulus.

Some examples of anionic bases can include hydrophobic molecules. In illustrative embodiments, examples of the hydrophobic molecules can include any alkyl group having an anionic base substituent such as but not limited to those described herein. The anionic, hydrophobic compounds described herein can provide specific examples. The hydrophobic anionic bases can partition into a micelle formed by the pH component, such as when the protein glue is under the second condition or exposed to a stimulus.

Optionally, examples of anionic, hydrophobic bases can include hydrotropes such as but not limited to, or others. A hydrotrope is a compound that solubilises hydrophobic compounds in aqueous solutions. Typically, hydrotropes consist of a hydrophilic part and a hydrophobic part (like surfactants) but the hydrophobic part is generally too small to cause spontaneous self-aggregation. Hydrotropes do not have a critical concentration above which self-aggregation spontaneously starts to occur (as found for micelle- and vesicle-forming surfactants, which have a critical micelle concentration or cmc and a critical vesicle concentration or cvc, respectively). Instead, some hydrotropes aggregate in a step-wise self-aggregation process, gradually increasing aggregation size. However, many hydrotropes do not seem to self-aggregate at all, unless a solubilisate (e.g., solubilizing agent) has been added. Hydrotropes are in use industrially. Hydrotropes are used in detergent formulations to allow more concentrated formulations of surfactants.

In one embodiment, the protein glue can include the one or more pH components such as an anionic surfactant, and include a hydrophobic anionic base. Examples of anionic surfactants and hydrophobic anionic bases are described herein.

In one embodiment, the first condition generally inhibits aggregation of the pH components and the second condition generally promotes or allows aggregation of the pH component. The following examples show first conditions and corresponding second conditions. In an illustrative embodiment, the first condition can include a first water concentration and the second condition has a different water concentration. The first water concentration may be lower than the second water concentration. In an illustrative embodiment, the first condition can include a first salt concentration and the second condition a different salt concentration. In an illustrative embodiment, the first condition can include one or more pH components having a first micelle amount and the second condition can include one or more pH components at a higher micelle amount. In an illustrative embodiment, the first condition can include a first amount of volatile organic solvent and the second condition can include a lower, second amount of the volatile organic solvent. In an illustrative embodiment, the first condition can include one or more pH components having a concentration lower that its critical micelle concentration and the second condition can include one or more pH components having a concentration at or higher than its critical micelle concentration. In an illustrative embodiment, the first condition can include reverse micelles containing basic compounds (e.g., compounds that have a basic pKa) where the reverse micelles are configured to break down under the second condition. In illustrative embodiments, the first condition is before an event that increases the pH, such as but not limited to evaporation. These first and second conditions as well as process or stimulus for changing from a first condition to a second condition are described in more detail below.

The change from a first condition to a second condition, such as a first water concentration to a second water concentration can occur via evaporation. As the water evaporates the concentration of the surfactant increases, and the surfactant forms micelles at the CMC. The formation of micelles associates all the anions close to each other, and energetically the abundance of negative charges close together results in acquiring protons (acid) to neutralize these charges. Accordingly, the negative charges attract protons from of the surrounding water, which effectively increases the pH. This increase in pH causes the proteins to denature so as to increase adherence.

In one aspect, an advantage can be realized by the protein glues being substantially devoid of volatile organic compounds (VOC). The lack of VOCs can result in the protein glues being environmentally friendly.

The first condition is present during manufacturing and/or storage of the protein glue, and the second condition can be present when the protein glue is used or applied to an article to be glued. As such, the composition can be prepared so as to be under the first condition so that it has a long storage life.

The first condition can include water or other solvent above a set level or amount that inhibits aggregation of the pH components, and the second condition can be water or other solvent below a set level or amount that allows aggregation of the pH components. This can be explained by the surfactant being below the CMC at the first condition and then evaporation can reduce the water so that the CMC is achieved and micelles form. The change in water can be through evaporation, absorption into another medium such as but not limited to the article to be glued, hydrolysis, or other water removing condition or stimulus such as but not limited to evaporation.

Also, the first condition can include the protein glue being under an inert atmosphere and/or in a closed container or system such that molecules are not able to freely move into or out from the glue composition. On the other hand, the second condition can be exposure to air or other non-inert atmosphere or be in an open environment so that molecules can freely move into or out from the glue composition. The second condition can be obtained by opening a container containing the glue composition or by applying the glue composition to an article in open air.

Additionally, the first condition can include a pH that is about neutral and the second condition can include a pH that is basic or alkaline. The pH can be changed by removing acidic components from the glue composition. Also, the pH can be changed by introducing alkaline components to the glue composition. Also, changes in pH can involve reactions between glue composition components that result in an increase in pH.

The first condition may be a lower salt concentration, and the second condition can be a higher salt concentration in comparison to the salt concentration when in storage. The salt concentration can be increased by removal of components from the glue composition so that the concentration of salt. For example, removal of water can increase the salt concentration. However, changes from a higher salt concentration (e.g., first condition) to a lower salt concentration (e.g., second condition) can be favorable and allow for increased protein-protein interactions. Salt concentrations can be reduced by salts combining with components in the composition so as to be substantially unavailable.

The first condition can include few or no micelles such as by the glue composition being below the CMC, and the second condition can include more micelles by the glue composition being above the CMC. A typical micelle in aqueous solution forms an aggregate with the hydrophilic head groups in contact with surrounding solvent such as water, sequestering the hydrophobic tail regions in the micelle center. The micelle is caused by the insufficient packing issues of tailed lipids in a bilayer. The difficulty filling all the volume of the interior of a bilayer, while accommodating the area per head group forced on the molecule by the hydration of the lipid head group leads to the formation of the micelle. This type of micelle is known as a normal phase micelle (e.g., oil-in-water micelle). Micelles are approximately spherical in shape. The shape and size of a micelle is a function of the molecular geometry of its surfactant molecules and glue composition conditions such as surfactant concentration, temperature, pH, and ionic strength.

The first condition can include reverse micelles containing basic compounds where the reverse micelles are configured to break down under the second condition that has less reverse micelles or is relatively free of reverse-micelles. Inverse micelles have the head groups at the center with the tails extending out (e.g., water-in-oil micelle). In a non-polar solvent, it is the exposure of the hydrophilic head groups to the surrounding solvent that is energetically unfavorable, giving rise to a water-in-oil system. In this case the hydrophilic head groups are sequestered in the micelle core and the hydrophobic groups extend away from the center. One method of breaking down reverse-micelles is to remove a volatile organic solvent from the glue composition. Also, water evaporation and/or salt concentration increases can also break down the reverse micelles. Optionally, the reverse micelles can include anionic bases as described herein that are released under the second condition.

Also, the first condition can include micelles and the second condition can include the micelles breaking down. The micelles can be formed from cationic surfactants and can also have anionic bases contained within the micelles. These micelles can be broken down by water evaporation or increasing salt concentration. In this instance, the pH components can be cationic surfactants and anionic bases, such as hydrophobic anionic bases.

In view of the foregoing, the change from the first condition to the second condition can be characterized by one or more of: water evaporation; charge accumulation; increase in pKa; increase in salt; being applied as glue; being devoid of volatile organic compounds; exposure to air; exposure to oxygen; or combinations thereof.

In one embodiment, the glue composition is substantially devoid of a volatile organic compound. (VOC) VOCs have been found to be less than environmentally friendly, and avoidance of using VOC can be favorable.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Additionally, methods of preparing a protein glue are described. A method of preparing a protein glue can include combining glue proteins with pH components. The method can also include combining an effective amount of the pH components to provide about a neutral pH in a first condition and a basic pH under a second condition. The glue proteins can undergo a conformational change in response to a pH change, and the pH components can change the pH of glue proteins in response to a change in one or more conditions. The glue composition can be prepared under a first condition that has a low or neutral pH. During manufacturing, a second condition that increases the pH to a basic pH can be avoided.

In one embodiment, the manufacturing method can include selecting one or more pH components based on the proteins used in the glue as well as the storage and gluing conditions. The pH components can be selected for particular glue proteins so that the composition has about neutral or acidic pH in a first condition. The pH components can also be selected to change in pKa and thereby change pH to be more basic or alkaline with respect to the glue proteins. The change in pH can be uniform through the glue composition, or the pH increase can be in a micro-environment. A micro-environment can be considered the local environment immediately adjacent or around the proteins, and only a micro-environment pH needs to change for a protein to change conformation. Thus, the pH components can be selected to change the pH of the glue composition.

Also, the process of selecting the pH components can include criteria related to the ability of the pH component to influence the conformation of the glue proteins. This can include the pH components maintaining a particular conformation at lower pH values and changing the protein conformation at higher pH values. Thus, the pH components can be selected to change the conformation of the one or more glue proteins.

In one embodiment, the glue proteins can be selected to have particular conformational characteristics at different pH values. The selection can include criteria related to the glue proteins having adhesive reduced adherent conformation at about a neutral pH compared to when at a basic pH. The selection can also include criteria related to the glue proteins having an increased adherent conformation at about a basic pH compared to when at a neutral pH. Also, the glue proteins can be selected to undergo a conformational change from a reduced adherent state to an increased adherent state in response to a pH change, such as an increase in pH.

The method of manufacturing a protein glue can include maintaining substantially a neutral pH during manufacturing and storage until the glue is used. Various techniques can be used for maintaining a substantially constant and about neutral pH (e.g, pH about 6.5-7.5 or about 7).

In one embodiment, a method of manufacturing a protein glue can include providing or obtaining selected proteins, such as soy proteins. Such providing or obtaining can include chemical processes for isolation or separation of proteins from their natural environment. Standard protein purification techniques can be employed. Similarly, the pH components can be obtained or prepared, as can the anionic bases. Standard glue manufacturing techniques known in the art as well as described in the incorporated documents can be used. Otherwise, standard mixing of the glue proteins with the surfactant and other additives described herein at an acidic or neutral pH can be performed to obtain a protein glue.

In order to prepare the glue composition, the glue proteins can be combined with a surfactant so as to form a glue composition having the surfactant at a concentration less than a critical micelle concentration at the first condition. The surfactant can have an anionic head group.

The manufacturing process can also include combining an anionic base with the glue proteins and the pH components.

Typically, the combining can include mixing at a reduced heat around room temperature and at atmospheric conditions. The mixing can be done at the solvent partial pressure. When the solvent includes a VOC or any solvent other than water, the mixing atmosphere pressure can be at the solvent partial pressure. The mixing can be at various speeds; however, slower mixing can be advantageous to retain the proteins in the folded or compact conformation.

The protein glues described herein can be used in various gluing methods and can be used to glue various articles. The protein glues can be prepared to glue articles similar to standard glues. Some examples of articles that can be glued include articles made from wood, ceramics, glass, paper, or others. The protein glues can be used in making particle board, plywood, or other particulate or fiber binding processes. For example, natural or synthetic materials with sulfurous plastics or protein structures can be glued especially well with the protein glue. Also, the protein glue can be used to glue articles similar to standard glues or adhesives. Also, the protein glue described herein can have an improved adherence that is closer to petrochemical adhesives/glues than when using previous glues of protein origin.

A method of gluing can include: providing a protein glue composition; and applying the glue composition to one or more articles to be glued such that the pH of the one or more glue proteins changes the conformation of the one or more glue proteins so that the one or more glue proteins adhere to the one or more articles. The glue composition can be provided at a neutral pH before being applied to the articles. Also, the glue composition can be at a neutral pH while being applied to the articles. Additionally, the glue can be applied at a first condition before introducing or allowing a second condition or stimulus to change the pH from about neutral to a basic or alkaline pH.

When being applied to the article, the glue proteins or a significant portion are provided in the glue composition in a folded conformation. A significant portion can be any portion sufficient for the glue composition to function with increased bonding and water resistance. While being applied, it is allowable for some proteins to have already changed conformation to an unfolded or expanded conformation.

After being applied, the glue composition can be caused or allowed to increase in pH, either throughout the composition or at microenvironments related to the glue proteins. While it can be easier for a single composition to be applied to glue an article, and additional composition, such as a composition having a stimulus or pH increasing component (NaOH or other base) can be applied to the protein glue to cause the increase in pH. Simply allowing a glue composition that is properly configured to be exposed to air can provide the second condition that increases the pH and allows for the glue proteins to unfold or expand and bind with the article.

The gluing method can include applying the protein glue so that the pH components are present at a concentration less than its CMC, and causing or allowing the concentration of the pH components to reach or pass the CMC such that micelles form. Accordingly, the gluing method can include forming micelles such that the pKa of the pH component is increased.

Additionally, the gluing method can include allowing or causing a change to the second condition. Such a change to the second condition can be obtained as described herein. For example, the change to the second condition can be obtained by: removing water or other solvent from the glue composition; evaporating water or other solvent from the glue composition; increasing concentration of a salt in the glue composition; breaking apart reverse micelles that contain anionic basic compounds; breaking apart cationic surfactant micelles that contain anionic basic compounds; exposing the composition to air; accumulating charge in the pH component; or exposing the composition to a stimulus that increases the pH.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. A liquid glue composition comprising:
 one or more glue proteins selected to undergo a conformational change from a substantially folded conformation to a substantially unfolded conformation responsive to a pH change;
 an aqueous medium; and
 one or more pH components selected to change the pH of the glue composition in response to a change in one or more conditions, the one or more pH components are a combination of an anionic surfactant and an anionic base;
 wherein the glue composition having the one or more glue proteins in the substantially folded conformation, aqueous medium, and one or more pH components is a storage stable liquid in a first condition at a pH of about 6-8 prior to the change in one or more conditions, wherein the glue composition is in the first condition and is below a critical micelle concentration.

2. The glue of claim 1, wherein the one or more pH components are present in an amount to maintain the one or more glue proteins in the substantially folded conformation at about neutral pH in the first condition and substantially unfold the one or more glue proteins at a basic pH under a second condition.

3. The glue of claim 2, wherein the one or more pH components includes an anionic surfactant having a moiety selected from the group consisting of laureates, oleates, stearates, palmitates, phenolates, naphtholates, phosphates, and phosphonates.

4. The glue of claim 2, wherein the anionic surfactant is a sodium or potassium salt of laurate, sulfate, oleate stearate, or palmitate present at a concentration such that the glue composition is in the first condition is less than a critical micelle concentration and is configured to form micelles at the second condition.

5. The glue of claim 2, wherein the surfactant includes an anionic charged head and one or more a hydrophobic tails.

6. The glue of claim 2, wherein the anionic base is a hydrophobic anionic base.

7. The glue of claim 2, wherein the first condition includes one or more of the following:
 a first water concentration and second condition being a different water concentration;
 includes a first salt concentration and the second condition being a different salt concentration;
 the one or more pH components having a concentration lower that its critical micelle concentration and the second condition includes the one or more pH components having a concentration at or higher than its critical micelle concentration;
 or
 a condition before an event that increases the pH.

8. The glue of claim 2, wherein a change from the first condition to the second condition is characterized by one or more of: water evaporation; charge accumulation; increase in pKa; increase in salt; being applied as a glue; being devoid of volatile organic compounds; exposure to air; exposure to oxygen; or combinations thereof.

9. The glue of claim 1, wherein the anionic base includes a portion selected from the group consisting of $H_2PO_4^{-1}$, $HPO_4^{-2}$, $PO_4^{-3}$, $HSO_3^{-1}$, $SO_3^{-2}$, $HCO_3^{-1}$, $CO_3^{-2}$, and $COO^{-1}$.

10. The glue of claim 9, wherein the anionic base is a hydrotrope.

11. The glue of claim 9, wherein the anionic base includes an alkyl group.

12. The glue of claim 9, wherein the one or more pH components include an anionic surfactant selected from the group consisting of laureates, oleates, stearates, palmitates, phenolates, naphtholates, phosphates, and phosphonates.

13. The glue of claim 12, wherein the anionic base includes a hydrophobic portion.

14. The glue of claim 9, wherein the one or more pH components include an anionic surfactant selected from the group consisting of a sodium or potassium salt of laurate, sulfate, oleate stearate, palmitate, or combination thereof.

15. The glue of claim 14, wherein the anionic base includes a hydrophobic portion.

16. The glue of claim 1, wherein the anionic base is selected from the group consisting of $H_2PO_4^{-1}$, $HPO_4^{-2}$, $PO_4^{-3}$, $HSO_3^{-1}$, $SO_3^{-2}$, $HCO_3^{-1}$, $CO_3^{-2}$, and $COO^{-1}$.

17. A method of preparing the liquid glue composition of claim 1, the method comprising:
 combining the one or more glue proteins selected to undergo conformational change in response to a pH change with the aqueous medium and the one or more pH components selected to change the pH of the one or more glue proteins in response to the change in one or more conditions so as to form the liquid glue composition that is storage stable in the first condition prior to the change in one or more conditions.

18. The method of claim 17, wherein the one or more pH components provide the one or more glue proteins with about neutral pH in a first condition and with a basic pH under a second condition.

19. The method of claim 17, further comprising selecting the one or more pH components to change the pH of the glue composition.

20. The method of claim 17, further comprising combining an effective amount of the one or more pH components to provide about a neutral pH in a first condition and a basic pH under a second condition.

21. The method of claim 17, further comprising maintaining substantially the neutral pH during storage until the glue is used.

22. The method of claim 17, further comprising combining a hydrophobic anionic base with the glue proteins and the one or more pH components.

23. A method of gluing, the method comprising:
providing the liquid glue composition of claim 1;
applying the glue composition to one or more articles to be glued in the first condition; and
inducing a change from the first condition to a second condition so that the pH of the one or more glue proteins changes the conformation of the one or more glue proteins so that the one or more glue proteins adhere to the one or more articles.

24. The method of claim 23, further comprising one or more of the following steps:
providing the composition at a neutral pH before being applied to the one or more articles;
providing the one or more glue proteins in the substantially folded conformation in the first condition; allowing the pH to increase after the applying;
selecting the one or more pH components to provide the one or more glue proteins with about neutral pH in the first condition and with a basic pH under the second condition; or
selecting the one or more pH components to change the pH of the glue composition upon exposure to air.

25. The method of claim 23, further comprising one or more of the following:
removing water from the composition;
evaporating water from the composition;
increasing concentration of a salt in the glue composition;
causing or allowing the pH to increase upon being applied to the one or more article; or
maintaining substantially a neutral pH of the glue composition during storage until the glue composition is applied to the one or more articles.

* * * * *